US008723721B2

(12) United States Patent
Moruzzis et al.

(10) Patent No.: US 8,723,721 B2
(45) Date of Patent: May 13, 2014

(54) OPTIMIZED MULTISTATIC SURVEILLANCE SYSTEM

(75) Inventors: Michel Moruzzis, La Norville (FR); Daniel Muller, Chaville (FR); Jean-Marie Ferrier, Paris (FR)

(73) Assignee: Thales, Neuilly sur Seine (FR)

( * ) Notice: Subject to any disclaimer, the term of this patent is extended or adjusted under 35 U.S.C. 154(b) by 80 days.

(21) Appl. No.: 12/979,503

(22) Filed: Dec. 28, 2010

(65) Prior Publication Data

US 2011/0215961 A1 Sep. 8, 2011

Related U.S. Application Data

(63) Continuation of application No. 12/781,161, filed on May 17, 2010, now abandoned.

(30) Foreign Application Priority Data

May 15, 2009 (FR) ...................................... 09 02365

(51) Int. Cl.
*G01S 13/10* (2006.01)
*G01S 7/28* (2006.01)
*H04B 1/69* (2011.01)
*G01S 13/00* (2006.01)
*G01S 7/00* (2006.01)
*H04B 1/707* (2011.01)

(52) U.S. Cl.
USPC .................. 342/59; 342/27; 342/52; 342/58; 342/60; 342/118; 342/134; 342/135; 342/145; 342/175; 342/195; 375/130; 375/140; 375/146; 375/147

(58) Field of Classification Search
USPC ................. 375/130–153; 342/21, 25 R–25 F, 342/26 R–26 D, 27, 28, 59, 175, 192–197, 342/450–465, 22, 52–55, 73, 82, 89, 90, 342/147, 158, 159, 42, 50, 58, 60, 118, 134, 342/135, 145; 340/500, 540, 541, 552

See application file for complete search history.

(56) References Cited

U.S. PATENT DOCUMENTS 3,161,870 A * 12/1964 Pincoffs ........................... 342/59
3,184,739 A * 5/1965 Franklin et al. ................. 342/59

(Continued)

FOREIGN PATENT DOCUMENTS

GB           2 405 760 A      3/2005
WO           02/097467 A2    12/2002

OTHER PUBLICATIONS

H. Deng et al., "Target Detection Using Orthogonal Netted Radar System (ONRS)", 2007 IET International Conference on Radar Systems, Oct. 15, 2007, pp. 1-4, XP002568382.

*Primary Examiner* — Bernarr Gregory
(74) *Attorney, Agent, or Firm* — Baker Hostetler LLP

(57) ABSTRACT

A multistatic radar surveillance system includes transmitter elements and receiver elements arranged according to a zone to be monitored, and a command and control unit that configures the elements and collects information relating to objects detected by the receiver elements. Each transmitter element transmits a signal, the bandwidth of which is substantially equal to the totality of a frequency band B allocated to the system. Each transmitter element transmits a common waveform to all of the transmitter elements, and the waveform is modulated by a binary signal specific to the element in question, this signal allowing each of the receiver elements receiving a signal to identify the transmitter element at the source of this signal. The coding applied to the waveform is defined so that the spread spectrum caused to the signal transmitted by the latter does not exceed the frequency band B allocated to the system.

7 Claims, 3 Drawing Sheets

(56) References Cited

U.S. PATENT DOCUMENTS

| | | | | |
|---|---|---|---|---|
| 3,691,558 A | * | 9/1972 | Hoard et al. | 342/59 |
| 4,347,513 A | | 8/1982 | Schindler | |
| 4,499,468 A | | 2/1985 | Montana et al. | |
| 4,605,922 A | * | 8/1986 | Blattman et al. | 340/552 |
| 4,994,809 A | * | 2/1991 | Yung et al. | 342/463 |
| 5,117,359 A | * | 5/1992 | Eccles | 342/26 D |
| 5,132,690 A | * | 7/1992 | Martin | 342/158 |
| 5,539,411 A | * | 7/1996 | Yu et al. | 342/54 |
| 6,031,485 A | * | 2/2000 | Cellai et al. | 342/192 |
| 6,300,895 B1 | * | 10/2001 | Carrara et al. | 342/55 |
| 6,653,970 B1 | * | 11/2003 | Mitra | 342/59 |
| 6,727,841 B1 | * | 4/2004 | Mitra | 342/25 R |
| 7,119,732 B1 | * | 10/2006 | Lam et al. | 342/27 |
| 7,199,750 B2 | * | 4/2007 | Bourdelais et al. | 342/90 |
| 7,205,930 B2 | * | 4/2007 | Ho et al. | 342/451 |
| 7,345,621 B2 | * | 3/2008 | Bourdelais et al. | 342/90 |
| 7,474,257 B2 | * | 1/2009 | Blunt et al. | 342/159 |
| 7,589,665 B2 | * | 9/2009 | Heide et al. | 342/195 |
| 8,060,339 B2 | * | 11/2011 | Ammar | 342/22 |
| 8,217,827 B2 | * | 7/2012 | Hayward et al. | 342/28 |
| 2006/0238407 A1 | | 10/2006 | Bourdelais et al. | |

\* cited by examiner

OPTIMIZED MULTISTATIC SURVEILLANCE SYSTEM

CROSS-REFERENCE TO RELATED APPLICATIONS

This application is a continuation of U.S. application Ser. No. 12/781,161, filed on May 17, 2010, now abandoned which claims priority to foreign French patent application No. 09 02365, filed on May 15, 2009, the disclosures of which are herein incorporated by reference in their entireties.

FIELD OF THE INVENTION

The invention relates to the field of radar surveillance, and in particular the field of surveillance systems using multistatic equipment (transmitters, receivers and central units) which are fixed or carried by mobile platforms (land, naval, air or space vehicles).

BACKGROUND OF THE INVENTION

Multistatic surveillance systems, in a known manner, have certain specific features which differentiate them in terms of design, production, deployment and maintenance from monostatic systems.

Amongst these specific features it is possible in particular to note the fact that such a system usually uses the radioelectric transmissions produced by several distinct transmitters preferably dispersed around the zone to be monitored or else inside this zone, these transmitters being cooperating items of equipment forming part of the system, or non-cooperating items of equipment the transmissions of which have a primary finality other than use for detection purposes. These can be broadcasting transmitters for example.

On the subject of specific features, it is also possible to note that, in such a system, there are usually several items of equipment responsible for receiving the radioelectric signals, these items of equipment being dispersed in the zone to be monitored.

It is also possible to note on the subject of the specific features that, in such a system, which like any detection system comprises a command and decision unit, the link between the command unit and the various transmitters and receivers requires the installation of communication means making it possible to both control the various elements from the command unit and to retrieve and exploit the information generated by these elements, in particular the information supplied by the various receivers relating to the objects detected in the monitored zone.

Consequently, when such a system is used, various problems arise, amongst which it is possible to cite:

problems associated with the spectrum of the transmitted signals and with the determination of the source of the received signals, problems associated with using communication means between the various elements of the system and the command unit, problems associated with the tolerance of the system to faults, problems associated with the capacity of the system to adapt to variations in its environment.

The problems associated with the spectrum of the signals transmitted and to the determination of the source of the signals received originate notably from the fact that a given receiver can exploit the signals that it receives only if it can identify and locate the source that has transmitted the radioelectric signal in question. This results in practice in the following two requirements:

a) the receiver has knowledge of the relative position of each transmitter that can be the source of a received signal, b) the receiver can recognize at any time which of the transmitters is the source of the signal that it receives.

Usually, and in particular if the transmitters used by the system are transmitters dedicated to this usage, these requirements are lifted by allocating a particular frequency band to each transmitter. Therefore since each of the receivers knows the spectral distribution of the transmissions, a given receiver can determine which transmitter is the source of the received signal. Consequently, the (bistatic) position of an object reflecting this signal can be determined in a known manner by measuring the time lag that separates the reception of the signal reflected by the object from the reception of the signal received directly from the transmitter.

This solution has the advantage of being simple to apply in principle, each transmitter then having a frequency band that is specific to it. However, if the system uses a considerable number of transmitters, each transmitter has a limited bandwidth for transmitting which, because the total frequency band allocated to the system is necessarily limited, may be insufficient to satisfy the resolution requirements imposed on the detection system.

The problems associated with using communication means between the various elements of the system and the command unit are, for their part, usually associated with the compromise to be made between the cost of producing and using the chosen means and the requirement to produce a multistatic detection system having a given flexibility. In other words, an installation comprising communication means using wire links will, for example, be less costly to integrate into the system in question than an installation comprising radio communication means. Specifically the installation of radio-link means requires in practice that each element of the system, transmitter, receiver and command unit, is provided with appropriate radio means.

On the other hand, an installation comprising communication means using wire links will, by its nature, be less easy to deploy over a wide monitoring area. It will also be more likely to see its effectiveness degraded, and even to break down, because of the intentional or unintentional breakdown of one or more wire links, which breakdown may occur during the period of operation of the system. Moreover, a wire communication structure seems in practice to be not very well suited to the deployment of a mobile detection system.

The problems associated with the capacity of the system to adapt to variations in its environment relate in particular to the capacity of the detection system to modify the waveforms transmitted by the various transmission means according to variations of the environment in which the surveillance zone is situated. This capacity is in practice limited by the bandwidth allocated to each transmitter, so that this capacity to adapt is usually limited.

In an attempt to limit the effects of the various requirements cited above, the user usually resorts to using several specific solutions, each solution being intended to solve a particular problem. Consequently the addition of means materializing these solutions makes the use of the system more complex and the system itself more costly.

SUMMARY OF THE INVENTION

An aspect of the invention provides an optimized solution making it possible in particular to produce a multistatic radar detection system that meets the various requirements specified above.

Accordingly, an aspect of the invention includes a multistatic radar system comprising a command and control unit which controls the configuration of a plurality of transmitter elements and receiver elements via command links and processes the detection information produced by the receiver elements. According to the invention, each transmitter element of this system is configured to transmit, on a common frequency band substantially equal to the overall frequency band B allocated to the system, a signal modulated according to a modulation law itself supporting a binary code specific to the transmitter in question. Each receiver element, moreover adapted to the frequency band B, is, for its part, configured to decode the received signals and identify, by means of the code supported by a given received signal, the transmitter that is the source of this signal. The coding applied to the waveform is moreover determined so that the spread spectrum caused to the signal transmitted by a given transmitter does not exceed the frequency band B allocated to the system.

In an embodiment of the multistatic radar system according to the invention, the command and control unit comprises a transceiver adapted to the frequency band B allocated to the system. The transmitter is configured to transmit a signal modulated by a binary identification code and by binary data frames representing a command message, and the receiver to receive a signal modulated by a binary identification code and by binary data frames representing an information message. Each transmitter element also comprises receiving means adapted to the frequency band B and configured to decode the received signals and identify by means of the code carried by the received signal the commands transmitted by the command and processing unit. Each receiver element comprises, for its part, transmission means adapted to the frequency band B and configured to transmit a signal modulated by a binary identification code corresponding to the receiver element in question and by a binary data frame constituting an information message to the command and processing unit.

In a particular configuration of the multistatic radar system according to the invention, the messages transmitted by the command and processing unit to the various transmitter elements and receiver elements comprise commands relating to the waveform that must be transmitted by the transmitter elements, and to the association of the transmitter and receiver elements.

In another embodiment of the multistatic radar system according to the invention, the messages transmitted to the command and processing unit by a transmitter element or receiver element comprise information relating to the operating state of the element in question.

In another configuration of the multistatic radar system according to the invention, the messages transmitted to the command and processing unit by a transmitter element or receiver element also comprise information relating to the geographic position of the element in question.

In another configuration of the multistatic radar system according to the invention, the messages transmitted to the command and processing unit by a receiver element also comprise information relating to the detection of objects in the space covered by the receiver in question.

BRIEF DESCRIPTION OF THE DRAWINGS

The features and advantages of the invention will be better appreciated by virtue of the following description, a description that explains the invention through a particular embodiment that is taken as a non-limiting example and that refers to the appended figures, figures which represent.

DETAILED DESCRIPTION

The issue here is the problem of primary surveillance, that is to say surveillance not requiring cooperation on the part of the objects that it is sought to detect, these objects being able to be land, naval, air or space objects.

Figure 1:
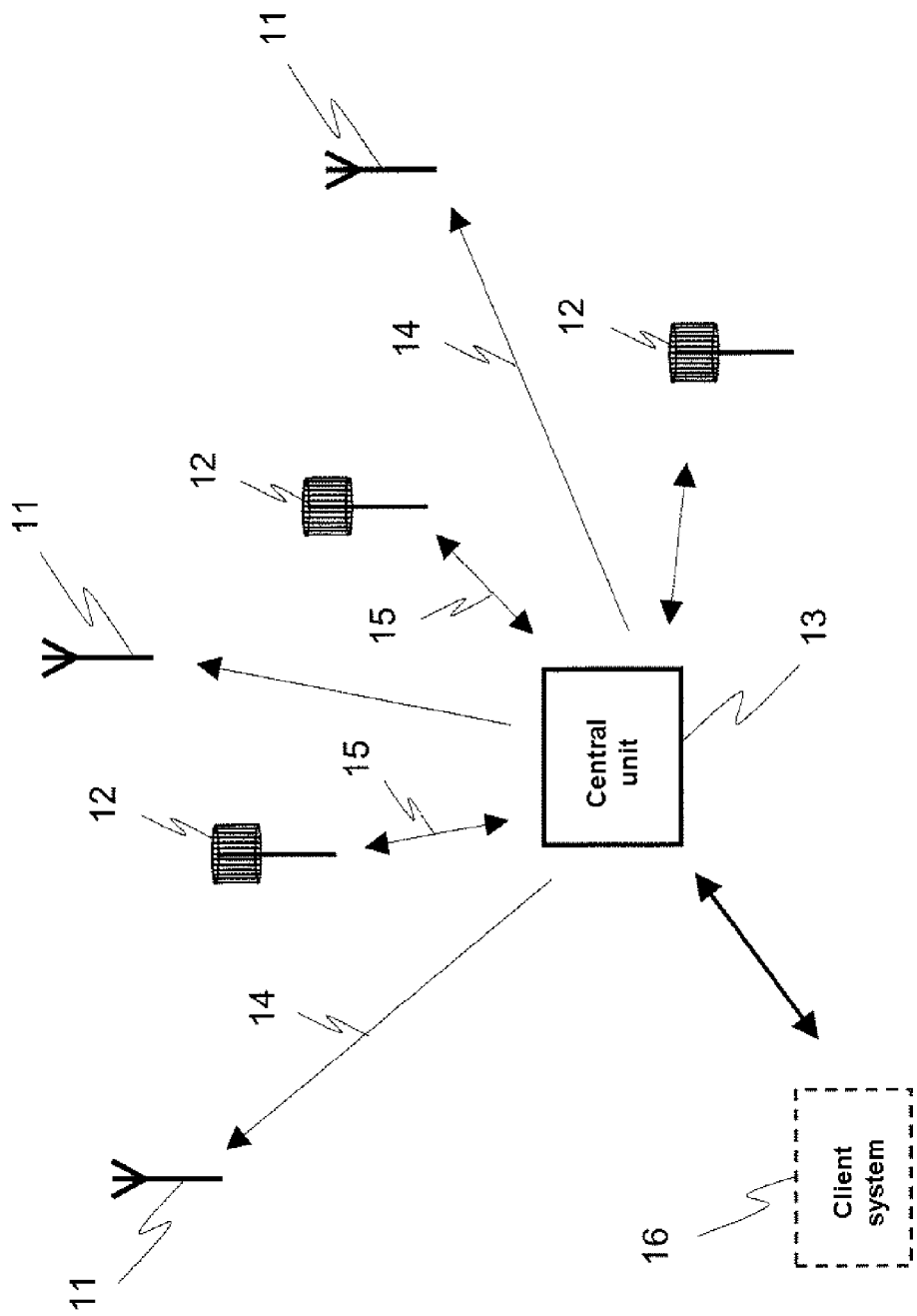
FIG. 1, a schematic illustration of the elements forming a multistatic system according to the invention, in a simple embodiment.

As illustrated in FIG. 1, the solution provided by the architecture according to the invention is based on the use of a network of omnidirectional transmitters 11 and receivers 12, the transmitters and the receivers being configured so as to be linked with one another and with a command and control unit 13 which may itself consist of various elements spread out or located in one and the same location as illustrated in FIG. 1. This command and control unit mainly configures the various elements of the system, transmitters and receivers and uses the information produced by the receivers, the information produced by a receiver relating mainly to the features of the objects detected by this receiver.

If necessary, the information produced may also be information relating to the operating state of the receiver in question.

The various elements of the system are configured by transmitting appropriate configuration commands 14 to the various elements of the system. These commands mainly comprise the type of waveform that must be transmitted by each transmitter and processed by each receiver. In a preferred embodiment, the transmitted waveform is identical for all the transmitters. As is developed in the rest of the description, the transmission of the configuration commands 14 may be carried out by various means. Synchronizing reception on transmission may moreover be carried out conventionally either by listening to the direct path on a specific channel of the receiver, or by transmission via a communication link.

Figure 2:
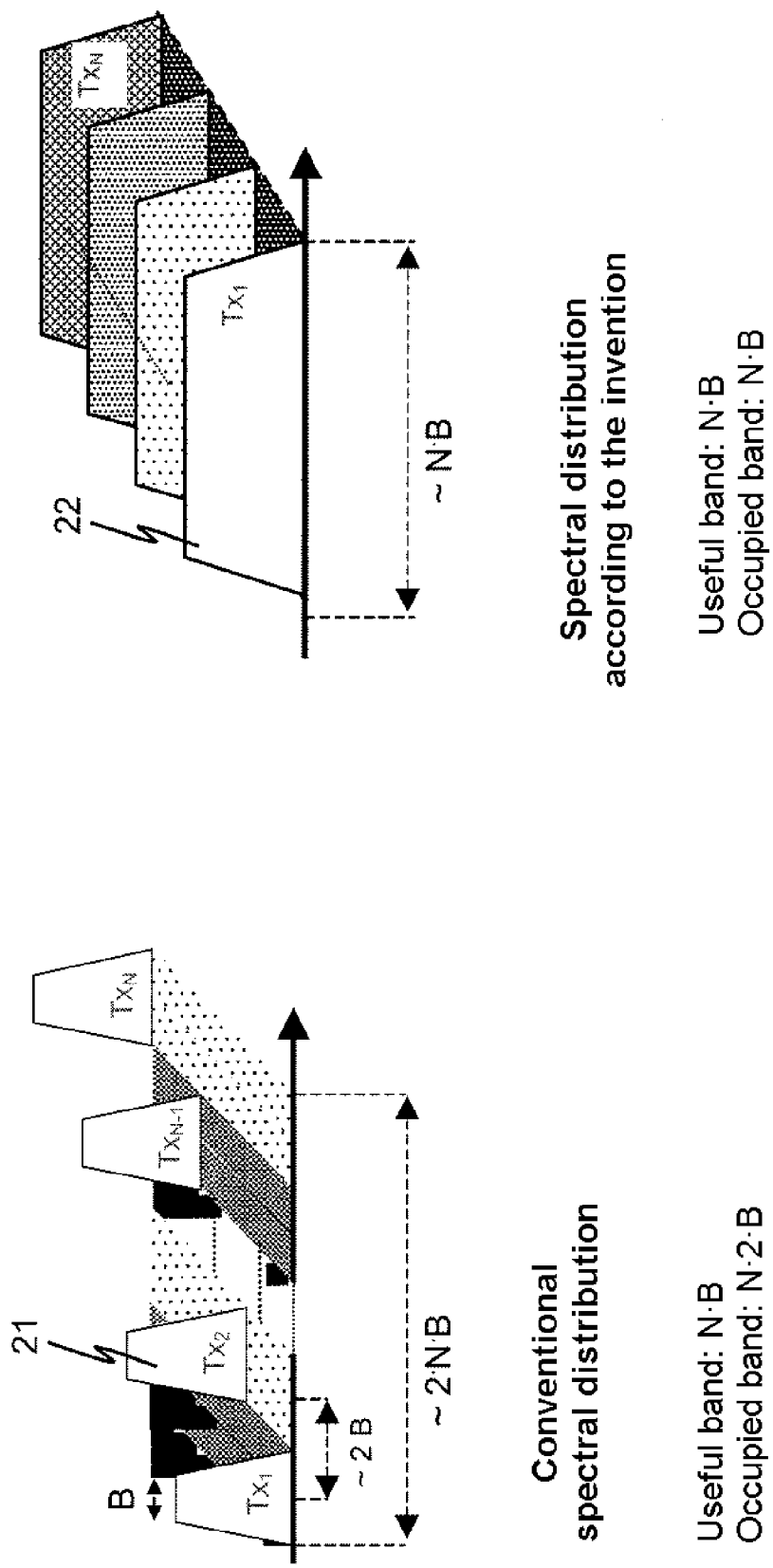
FIG. 2, an illustration of the principle of the spectral distribution of the transmitted signals according to the invention.

In a conventional manner, in a multistatic detection system, the detection is carried out on the one hand by the transmission of distinct waveforms by each transmitter, and on the other hand by virtue of the simultaneous reception of all the signals reflected by a target. Usually, in a multistatic system, each of the transmitters of the system is identified by the bandwidth of the signal that it transmits. Accordingly, the spectrum of the transmitted signal occupies a frequency band that is dedicated to it, as illustrated in FIG. 2-$a$, which has the result of greatly limiting the bandwidth 21 that each transmitter can occupy. In practice, if the system comprises N transmitters, the useful bandwidth b of the signal transmitted by each transmitter must be limited so as to comply, in a known manner, with the following relation:

$$2 \cdot N \cdot b \leq B \quad [1]$$

in which B represents the bandwidth allocated to the operation of the system in question Consequently, the signals originating from each transmitter are identified and separated from one another by simple filtering. However, this bandwidth limitation has the result that the waveform used must be chosen in a restrictive manner by ensuring that the spread spectrum caused by the modulation of the transmitted signal remains contained in the band b.

Unlike this known operating principle, the principle of transmission according to the invention consists, as illustrated in FIG. 2-b, in allocating to each of the transmitters a bandwidth 22 that is substantially equal to the totality of the frequency band B allocated to the system. In this way the waveform used may have a much greater spread spectrum than in the conventional case. As a result, it is possible advantageously to obtain increased accuracy of distance measurement. In addition, the number of transmitters that such a system can use, taking account of the frequency band allocated to it, is advantageously increased in large measure.

Consequently, since each transmitter occupies, in this configuration, the same frequency band 22, the identification of a given transmitter is no longer achieved by means of the frequency band that it occupies in the overall band B, but by an identification signal which encodes the transmitted waveform. In this way, in operation, all the transmitters transmit one and the same waveform having one and the same spectral occupancy, the waveform transmitted by each of the transmitters nevertheless having a code specific to the transmitter in question. In other words, the signal transmitted by each transmitter differs from that transmitted by the other transmitters by a code specific to the transmitter in question being overlaid on the waveform used for detection. In this way, all the transmitters can transmit simultaneously without interfering with one another.

According to the invention, the transmitted signals therefore have a spread spectrum associated with the overlaying of an identification code on the wave used for detection. This spread spectrum is however defined so that the spectrum of the transmitted wave does not extend beyond the frequency band allocated to the system.

According to the invention, the specific code which modulates the waveform used is moreover defined so that the modulation of the general waveform by this code does not adversely affect the performance of the receivers. This code is in particular determined so as to make it possible on the one hand to optimize the detection function, in particular by minimizing the level of the secondary lobes of the autocorrelation function of the transmitted signal and on the other hand to isolate as much as possible the signals reflected by a target originating from various transmitters, by minimizing in particular the level of intercorrelation of the codes used by the various transmitters.

Consequently, the source of the waves received by a given receiver composing the multistatic system is determined by decoding the identification code incorporated into the waveform. The source of the received signal being thus determined, the receiver in question can apply to the received signal a conventional bistatic process. The 3D location is based on the information available in each elementary (bistatic) signal, and through a (coherent or incoherent) process of merging of signals over all of the bistatic bases formed by the transmitter-receiver pairs that can be considered.

To manage the whole system, the command and control unit 13 uses appropriate communication means.

In one embodiment of the multistatic system according to the invention, illustrated by FIG. 1, the information transmitted to the various elements, transmitters and receivers, is essentially the information relating to the waveforms used. The information transmitted to the command and control unit 13 is also, essentially, the information relating to the detections registered by the various receivers. The links 14 between the command and control unit 13 and the transmitters 11 are then for example one-way links, while the links 15 between the command and control unit 13 and the receivers 12 are two-way links. These links can either be simple wire links or radioelectric links, advantageously using the frequency band allocated to the system.

Figure 3:
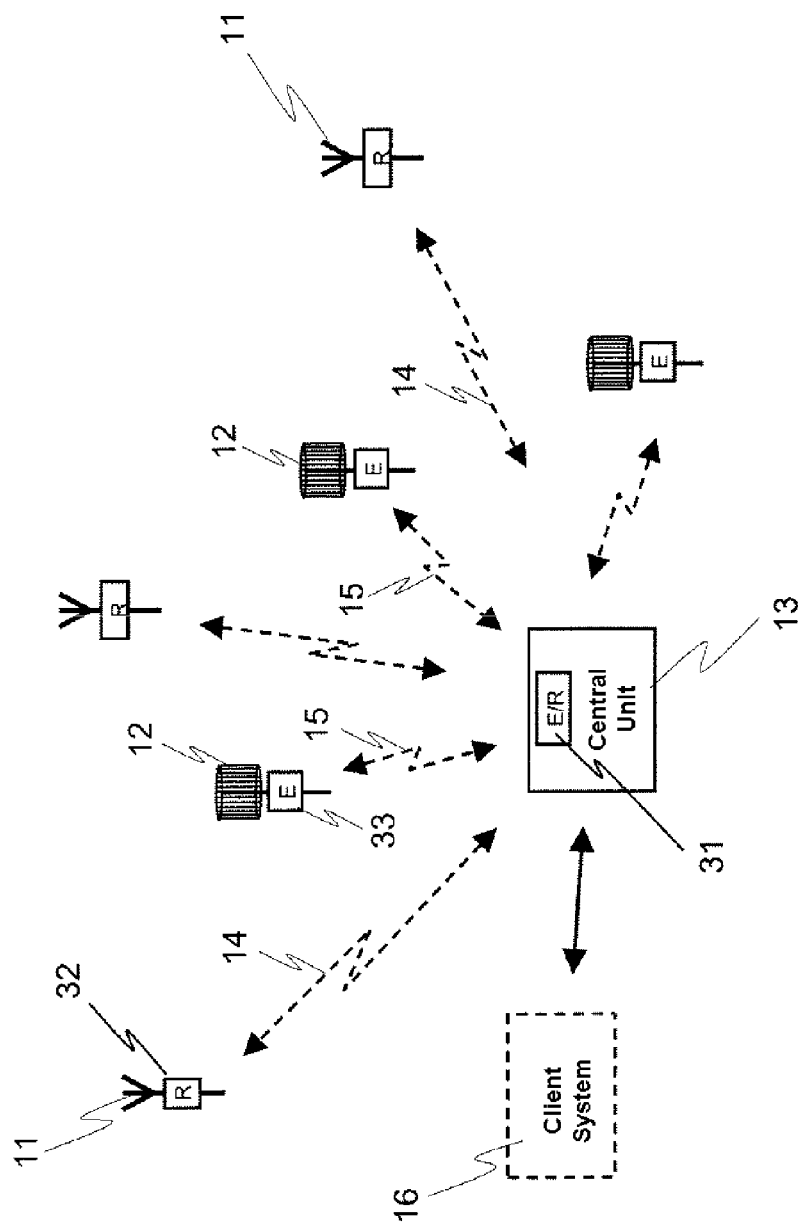
FIG. 3, a schematic illustration of another embodiment of the multistatic system according to the invention.

In this second case, illustrated by FIG. 3, the command and control unit 13 comprises transmitting and receiving means 31, preferably omnidirectional means, allowing it to transmit a radioelectric command signal containing notably the information relating to the chosen waveform and to receive the information originating from the various elements 11 and 12 of the system. Moreover, each transmitter 11 then comprises means 32 allowing it to receive the information transmitted and to identify the signals transmitted by the command and control unit 13. Each receiver element 12 comprises, for its part, the means 33 allowing it to transmit the detection information to the command and control unit 13.

According to the invention, the command information transmitted by the command and control unit and the information transmitted to the command and control unit 13 by the elements 11 and 12 are carried by signals the bandwidth of which is included in the band B allocated to the system. Each item of information is moreover associated with a particular code which identifies the element that is the source of the information, control unit 13, transmitter 11 or receiver 12.

Advantageously, such a configuration requires only few modifications relative to the basic configuration illustrated by FIG. 1.

Therefore, the transmitter elements 11 are simply equipped with means appropriate to the reception of the commands transmitted by the command and control unit 13, the information transmitted to the command and control unit 13 moreover being advantageously transmitted by the transmission means already used by the transmitter element 11 for transmitting the detection signal.

Conversely, the receiver elements 12 are simply fitted with means appropriate to the transmission of the information intended for the command and control unit 13, the information transmitted by the command and control unit 13 moreover being advantageously transmitted to the receiving means already used by the receiver element 12 to receive the signals directly from the transmitters 11 or resulting from the reflection of these signals by objects.

The code transmitted by the means 31 of the command and control unit 13 allows each receiver 12 to determine that the received signal is a command message and that it must be treated differently from the detection signals. Similarly, the codes transmitted by the means 32 of the receiver elements 12 allow each receiver to determine that the received signal is an item of information intended for the command and control unit 13. Finally, when a transmitter element 11 transmits an item of information to the command and control unit 13, the latter is associated with a code which allows each receiver element to know that the received signal corresponding to this code is intended for the command and control unit 13 and not for detection.

The use, according to the invention, of radioelectric transmissions in which the transmitted signal is an encoded signal therefore advantageously makes it possible to simply produce a wireless link between the command and control unit 13 and the other elements 11 and 12 of the system. It does not in particular require the installation of a transceiver 31, preferably omnidirectional, in the command and control unit 13, the addition of receiving means, preferably omnidirectional, in the transmitters 11 and of transmission means, preferably also omnidirectional, in the receivers 12. The wireless link thus produced advantageously makes it possible to simply produce multistatic systems that are mobile and easily redeployable.

The embodiment illustrated by FIG. 3 advantageously makes it possible to produce a multistatic system the structure of which can be reconfigured both according to variations of operational functioning and according to the appearance of accidental malfunctions affecting a particular element of the system.

Therefore, for example, the omnidirectional radioelectric links connecting the command and control unit to the other elements can be used to upload to the command and control unit information relating to the operating state of each of the other elements, each element comprising, in this case, means for running an integrated test of its own operating state. In this way, knowing that an element has failed, the command and control unit can advantageously reconfigure the whole system so as to minimize the impact of the fault on the overall detection performance.

In the same manner, in the case of a multistatic system in which the elements are mobile, these links can be used to allow the command and control unit to determine the absolute positions of the various elements and their relative positions. To do this, each element can be, for example, provided with a positioning system of the GPS or other type, and periodically transmit its position to the command and control unit. Therefore, the position of each element being known, the whole system can be configured in an optimal manner at any time. Moreover, since the geographic position of each receiver is thus known, it is therefore advantageously possible to carry out the geolocation of the aircraft that can be detected by the various receivers.

It should be noted that the information transmitted by the various elements of the system to the command and control unit 13 can be either used locally in the latter, or remotely by an overall operating system 16, called the client system, that is connected to the latter and to which this information is transmitted. In the same manner, the commands for configuring the various elements and the waveform used can be determined either locally in the command and control unit, or remotely by an overall system 16 having knowledge of operational and environmental data of a kind to induce a modification of the operation of the system, these modifications then being applied by means of the command and control unit.

In the latter case, so as to optimize the form and pertinence of the information supplied to the client system, the command and control unit may notably comprise:

an automatic computing means making it possible to optimize the coverage achieved by the system, designed to supply the locations of the covered zone that are favourable to the installation of a particular element 11 or 12 of the system. The means for automatically computing the coverage makes it possible to translate, in real time, the weather information into magnitudes influencing the performance of the system. This means incorporates means for evaluating propagation conditions based on a digital map of the terrain and a weather map;

a means for determining the optimal operation of the receivers 12, the role of which is to optimize the local performance of the system according to an overall situation, in order to strengthen the processing gain in certain poorly covered regions for example;

means for acquiring weather information which may consist in:
  access to a network for general broadcasting of the information collected by the existing weather stations;
  access to a specific network, a network of weather stations, a station being incorporated into each element, transmitter 11 or receiver 12, of the multistatic system;
  use of a particular channel for processing the multistatic system itself, a "wind-profiler" channel or more conventionally a polarimetric weather channel for example; this channel being formed in one or more of its elements, transmitter 11 or receiver 12.

automatic analysis means making it possible:
to optimize the processing of the radar with respect to the weather environment (for example adjusting of the TFAC processes, etc.);
to supply information on the current coverage of the system, with, if necessary, a warning capability allowing the user to be informed on an abnormal situation;
to supply information on certain phenomena, of the "wake-vortex" type for example, that may have an effect on air safety.

What is claimed is:

1. A multistatic radar system comprising a command and control unit configured to control configuration of transmitters and receivers via command links and process detection information produced by the receivers, wherein:
at least one transmitter of the transmitters is configured to transmit, on a common frequency band substantially equal to a frequency band B allocated to the multistatic radar system, a signal modulated according to a modulation law which supports a binary code specific to the at least one transmitter,
at least one receiver of the receivers is adapted to the frequency band B, and is configured to receive the transmitted signal from the at least one transmitter, decode the received signal, and identify, based on the binary code supported by the received signal, that the at least one transmitter is the source of the received signal, and
the binary code is supported by coding applied to a waveform of the transmitted signal that has a spread spectrum that does not exceed the frequency band B allocated to the multistatic radar system.

2. The multistatic radar system according to claim 1, wherein:
the command and control unit further comprises a transceiver adapted to the frequency band B allocated to the multistatic radar system,
the transceiver is configured to transmit a signal modulated by a binary identification code and by binary data frames representing a command message, and to receive a signal modulated by a binary identification code and by binary data frames representing an information message,
the at least one transmitter further comprises receiving means adapted to the frequency band B allocated to the multistatic radar system and configured to receive the signal transmitted by the transceiver, decode the received signal, and identify, based on the binary identification code carried by the received signal, commands transmitted by the command and control unit, and
the at least one receiver further comprises transmission means adapted to the frequency band B allocated to the multistatic radar system and configured to transmit a signal, modulated by a binary identification code corresponding to the at least one receiver and by a binary data frame comprising an information message, to the command and control unit.

3. The multistatic radar system according to claim 2, wherein messages transmitted by the command and control unit to the transmitters and receivers comprise commands relating to the waveform that is transmitted by the transmitters, and to an association of the transmitters and of the receivers.

4. The multistatic radar system according to claim 2, wherein messages transmitted to the command and control unit by the at least one transmitter or the at least one receiver comprise information relating to an operating state of the at least one transmitter or the at least one receiver.

5. The multistatic radar system according to claim 4, wherein the messages transmitted to the command and control unit by the at least one transmitter or the at least one receiver also comprise information relating to a geographic position of the at least one transmitter or the at least one receiver.

6. The multistatic radar system according to claim 5, wherein messages are transmitted to the command and control unit by the at least one receiver, and the messages transmitted to the command and control unit by the at least one receiver also comprise information relating to detection of objects in a space covered by the at least one receiver.

7. The multistatic radar system according to claim 4, wherein messages are transmitted to the command and control unit by the at least one receiver, and the messages transmitted to the command and control unit by the at least one receiver also comprise information relating to detection of objects in a space covered by the at least one receiver.

* * * * *